United States Patent [19]

Cook, Jr.

[11] 4,118,263

[45] Oct. 3, 1978

[54] METHOD OF MANUFACTURING STRUCTURAL HONEYCOMB WITH INTEGRAL HEAT RADIATION SHIELDS, AND THE RESULTING PRODUCT THEREOF

[76] Inventor: William H. Cook, Jr., 875 SE. Shoreland Dr., Bellevue, Wash. 98004

[21] Appl. No.: 755,819

[22] Filed: Dec. 30, 1976

[51] Int. Cl.² .............................................. B31D 3/02
[52] U.S. Cl. ..................................... 156/197; 428/119; 29/455 LM
[58] Field of Search .................. 156/197; 52/615, 618; 428/116, 118, 119; 29/469.5

[56] References Cited

U.S. PATENT DOCUMENTS

| | | | |
|---|---|---|---|
| 2,608,502 | 8/1952 | Merriman | 156/197 X |
| 2,983,640 | 5/1961 | Knoll | 156/197 |
| 3,366,525 | 1/1968 | Jackson | 156/197 |
| 3,810,800 | 5/1974 | Doll | 156/197 X |
| 3,853,681 | 12/1974 | Kehr | 156/197 X |
| 3,887,418 | 6/1975 | Jurisich | 156/197 |

*Primary Examiner*—Leon Gilden
*Attorney, Agent, or Firm*—Roy E. Mattern, Jr.

[57] ABSTRACT

A method of manufacturing structural honeycomb with superior insulation effectiveness, by the incorporation of integral heat radiation shields into the current process of manufacturing honeycomb hexagonal cells as formed by expanding a block of flat laminations. The heat radiation shields are initially in the form of flat ribbons of thin low emissivity metal coated plastic film, which are bonded between each lamination, in a direction normal to either the adhesive lines, strips, or stripes, or unmasked stripes, strips, or lines, used to bond the honeycomb nodes. The ribbons are formed of compressed pleats, which open up when the flat laminated block is expanded, closing off each hexagonal cell with spaced heat radiation shields.

7 Claims, 8 Drawing Figures

METHOD OF MANUFACTURING STRUCTURAL HONEYCOMB WITH INTEGRAL HEAT RADIATION SHIELDS, AND THE RESULTING PRODUCT THEREOF

BACKGROUND OF INVENTION

Honeycomb of thin material is generally manufactured, in a continuous process, often referred to as an expansion process, as described, for example, in U.S. Pat. Nos. 2,610,934, 2,608,502, 2,734,843, and 2,983,640. Generally in these honeycomb expansion processes, flat sheets are cut from rolls of materials, adhesives are applied in selective lines, strips, or stripes to materials needing a bond adhesive, or masking is undertaken by using non bonding strips, if the materials will bond directly together at the pre-selected non masked lines, strips or stripes. Thereafter the flat sheets closely stacked are so positioned until the selective bonding along the lines, strips, or stripes is completed. Then the block, so formed, of bonded flat sheets, is expanded to form the honeycomb.

Such honeycomb products are used as the core in structural sandwich panels to provide a light weight rigid structure. In many applications where honeycomb is thus used, a combination of structural strength and highly effective heat insulation is often required. In the past this has been partially accomplished by stuffing each cell with fiberous insulation, or by filling the cells with foam. This adding of the insulation has been done subsequently to the manufacture of the basic honeycomb, thereby adding production flow time, and also adding operational disadvantages. Moreover, such insulations may absorb moisture or become contaminated with an undesirable gas or liquid over an extended period of time. This contamination could result from leaks through openings made during manufacture of honeycomb or through damaged areas during use, or through porous areas of a sandwich face sheet, otherwise forming the sealing of a final honeycomb structure.

When hazardous liquids and gases are involved, the detection of small leaks with sensitive indicators is essential. A small leak can be located by pressurizing the honeycomb with a gas that is readily detectable. The honeycomb cells can be interconnected by the use of perforated material used in the manufacture of the basic honeycomb. This permits location of the leak in the sandwich walls. The interconnection of the honeycomb cells also permits cleaning by flushing with an inert gas. Removal of all the contaminates is essential for the detection of future small leaks. The interconnection also permits substitution of air with a low conductivity gas, or evacuation, for improved insulation. This use of interconnection and flushing is taught in U.S. Pat. No. 3,895,152.

In other applications of honeycomb, sealed cells are desired, to isolate and control contamination, as taught in U.S. Pat. No. 3,669,816.

In the case of U.S. Pat. No. 3,895,152, foam insulation, is located in a portion of the length of the honeycomb cell. It is desirable to avoid such insulation, as it will absorb small amounts of contaminates.

Also the effective use of more of the entire length of the honeycomb cell for insulation purposes is desirable. A large part of heat transfer is due to radiation. While foam serves to block this radiation, foam also causes heat transfer by solid conduction, besides having the contamination disadvantage.

Multiple radiation shields made of low emissivity metal foil or metal coated plastic have been used in so called super insulations in turn incorporated into space vehicles. In this super insulation a very large number of radiation shields are separated and supported by low density fiberous mats or webbing. However these separation mats cause solid heat conduction. Also such super insulations have no structural strength, as is needed in many applications to support tanks and to resist structural loads. This necessitates solid structural members bridging such super insulations, thus causing a large heat leak.

Honeycomb has a very high compressive strength to weight ratio in the direction of the hexagonal cell axis. However the open honeycomb cells do not block heat radiation. Heat radiation shields might be inserted in each honeycomb cell and bonded in place after the basic manufacture of the honeycomb. However this would be impractical. Another approach might be to place a radiation shield between slices of honeycomb. However the honeycomb cells on either side of a shield might not register. Therefore a compressive load on the honeycomb would cause the cell walls to cut into each other, unless the heat radiation shield was of sufficient thickness to resist cutting and to transfer the loads from one honeycomb cell to the other.

Therefore the initial incorporation of one heat radiation shield or multiple heat radiation shields within the entire length of each single hexagonal cell and all its adjacent cells, and all honeycomb cells of the resulting structure, as an efficient inserted step in the basic expansion method of the manufacture of honeycomb, would be desirable, and this method and resulting product meet this need.

SUMMARY OF THE INVENTION

With the current expansion continuous processes of manufacturing honeycomb being essentially retained, such as set forth in U.S. Pat. Nos. 2,608,502, 2,610,934, 2,734,843, 2,983,640, and others, the insulation material needed to produce the heat radiation shields is introduced between the initially flat honeycomb sheets, before they are stacked and bonded into an unexpanded block, which is later expanded to form the hexagonal cells. The heat shield insulation material, in respective embodiments, is made of thin metal foil or metal coated plastic. It is cut from continuous roll materials into strips having lengths equal to the resulting honeycomb panels, and having widths slightly more than the honeycomb cell cross-sectional size. It is then pleated, and compressed into a flattened ribbon of less width. This ribbon is bonded to the basic honeycomb material in a direction normal to the adhesive lines, strips or stripes used to bond the honeycomb nodes, or to the unmasked lines, strips, or stripes in other processes using bondable flat honeycomb sheets. When the laminated block, composed of many sheets, is expanded to form the honeycomb, the pleats of the ribbons open up, closing off each honeycomb cell with a heat reflective shield, or shields, if more than one pleated ribbon is arranged per each honeycomb cell.

The resulting product from this expansion process, is a very effective structural and insulated honeycomb core for sandwich panels utilized in producing large tanks, buildings, space vehicles, and many other products.

The advantage over other insulated products is that the expanded honeycomb remains structurally efficient,

DESCRIPTION OF THE PREFERRED EMBODIMENT

Figure 1:
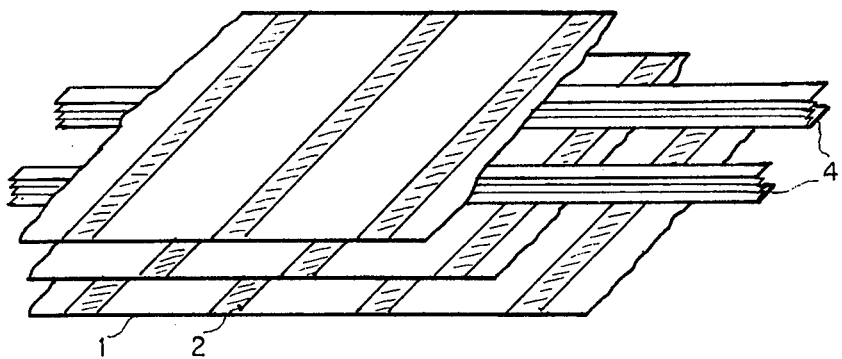
FIG. 1 in a partial perspective view, of a preferred embodiment, shows the initial step in the expansion method of producing honeycomb wherein flat sheets, often originally unrolled from a roll supply and then cut off to length, are coated with adhesive lines, strips, or stripes, and also in respect to this invention pleated ribbons of heat radiation shields are coated with adhesive and placed between the flat sheets and then the sheets are pressed together to create the bond and form a block to be later expanded to form the honeycomb with integral heat radiation shields derived from the expanded pleated ribbons.

General Comments re Prior Developed and Presently Used Methods of Making Honeycomb by Using Expansion Processes Prior developed and presently used methods of making honeycomb by using expansion processes are illustrated and described in many U.S. patents, such as patents numbered U.S. Pat. Nos. 2,608,502, 2,610,934, 2,734,843, and 2,983,640. Generally in these honeycomb expansion processes, flat sheets are pulled from rolls of materials and cut off. Adhesives are applied in selective and spaced lines, strips, or stripes, to materials needing the addition of a bonding adhesive to selectively join them together, such as aluminum materials. Or in other honeycomb expansion processes, wherein plastic materials are used, which, when heat is applied and pressure is applied, will bond together, then masking is undertaken by using non bonding strips of materials. Subsequently, in either general honeycomb manufacturing procedure, the flat sheets compressed together during bonding, are thereafter expanded from their block form into their honeycomb form. It is in these general honeycomb manufacturing procedures, new steps of this invention are added to insert pleated ribbons with their adhesives, to create pleated heat radiation shields which later expand fully, at the same time when the honeycomb materials are created by expansion from their unexpanded blocks. FIGS. 1 through 8 indicate how the pleated ribbons with their adhesives are utilized in honeycomb manufacturing processes to create, upon expansion, the heat radiation shields.

Materials Used

In some honeycomb applications, the basic material 14 provided in rolls to create the flat sheets 1, should have low cost, low heat conductivity, sufficient structural strength, and provide for good bonding. Kraft paper is the best current choice. Additional strength of the kraft paper is obtained with impregnation with phenolic resin, accompanied by some increase in heat conductance.

The structural requirements of a particular heat insulated honeycomb sandwich is met by selection of the thickness of the basic sheet material 14 and hexagonal cell 3 size, possibly 1/2" to 1".

Heat Radiation Shields

The pleated heat radiation shield ribbon 4 is made of very thin material which is coated with highly reflective metal. Good tear resistance is also required. Polyester film is satisfactory, although fluoroplastic is desired because of its better high and low temperature resistance. A large number of radiation shields is desirable, as the conductivity varies inversely with the number of the heat radiation shields plus 1. The minimum spacing is about ¼ of the dimension of the honeycomb hexagonal cell width. In a honeycomb thickness of 4 and ¾ inches, 14 heat radiation shields per cell are possible. The thickness of the honeycomb for applications in large tanks will be from 4 to 10 inches, such as for large cryogenic tanks containing liquid natural gas, referred to as LNG tanks. For other structural applications, where the thickness of a sandwich panel is relatively thin, one or more radiation shields are beneficial.

Figure 5:
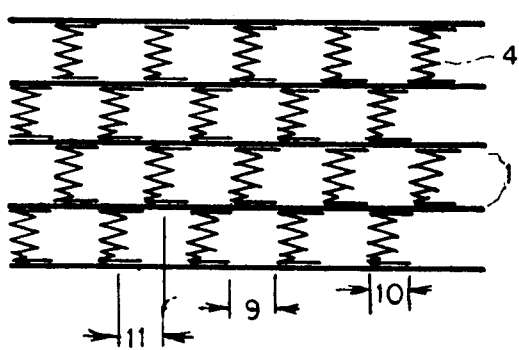
FIG. 5 is a partial cross sectional end view of the sheets before compression into a block, looking in the direction of the pleated heat radiation shield ribbons which are closely spaced by a distance which is slightly greater than the width of the pleated heat radiation ribbon, to thereby allow sufficient bonding area of the honeycomb nodes, and also the pleated ribbons are staggered between alternate layers of sheets in order to avoid any local build up of the overall blocks due to the thickness of the pleated heat radiation shield ribbons.

The Heat Radiation Shields are Expanded From Compressed Pleated Ribbons of Heat Radiation Materials, Which are Inserted Between Flat Sheets of Honeycomb Materials Before the Compresion Step, During the Expansion Processes of Making Honeycomb In respect to the methods of manufacture of expanded honeycomb inclusive of heat radiation shields, and the resulting product, FIG. 5 shows in end view, the sheets 1 of the basic material 14 before compression into a block, looking in the direction of the pleated heat radiation shield ribbon 4. These ribbons 4 are closely spaced by a distance 9, which is slightly greater than the width 10 of the ribbon 4. This spacing allows sufficient bonding area of the honeycomb nodes 8. It is desirable to stagger, as indicated at location 11, the placement of the pleated ribbons 4 between alternate layers of sheet 1 in order to avoid local build ups of blocks due to the thickness of the pleated ribbons 4.

Figure 6:
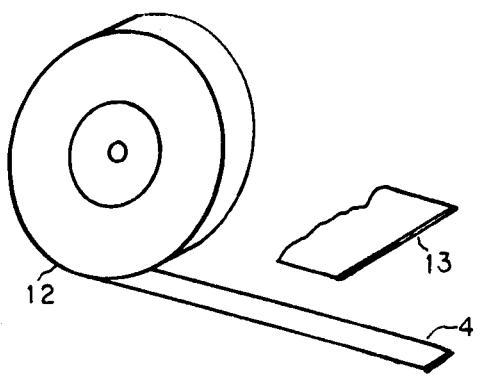
FIG. 6 is a perspective view of the pleated ribbon prepared in a roll with the pleats compressed and lightly bonded at the edges forming a ribbon which is readily applied to the sheets.

In FIG. 6 the pleated ribbon 4 is shown prepared in a roll 12, with the pleats compressed and lightly bonded at the edges 13 forming a ribbon 4 which is readily applied to the sheets 1. As indicated in FIG. 1, the pleated ribbons of heat radiation materials 4, are placed between sheets 1 of the honeycomb materials. In FIG. 1, the ribbons 4 are only shown inserted between the upper two pairs of honeycomb materials 1. Preferably, however, they are inserted between all pairs of honeycomb materials 1, forming spaced radiation shields 6, as indicated by the dotted lines in FIG. 3, throughout the length of a honeycomb cell.

Figure 2:
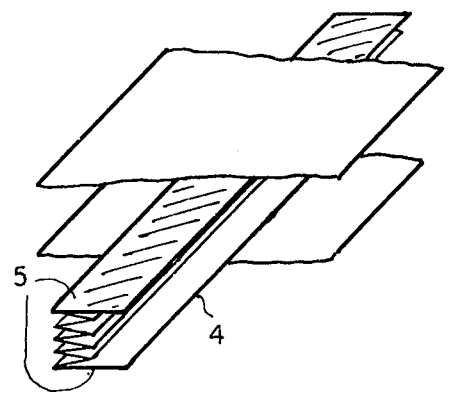
FIG. 2 in a partial perspective view illustrates the end of two adjacent flat sheets being pulled apart to form the hexagonal cells showing how the heat radiation shields in this process are incorporated using a pleated ribbon to create these heat radiation shields made of highly reflective metal foil or thin plastic film coated with metal, which are inserted between the flat sheets with the pleated ribbon arranged in a direction normal to or at a large angle to the adhesive lines, strips, or stripes.
Figure 3:
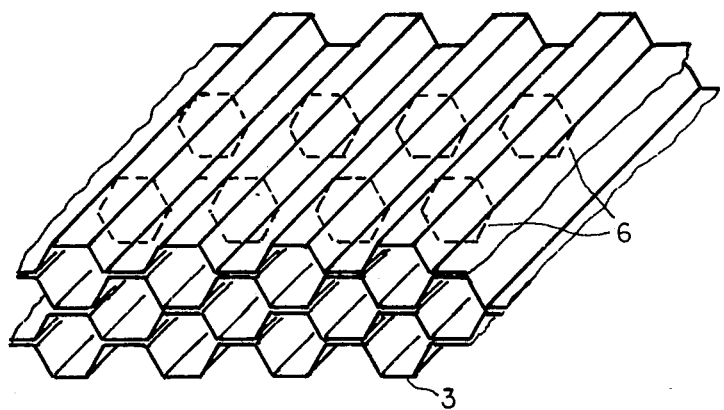
FIG. 3 in an enlarged partial perspective view shows the expanded honeycomb, in part, indicating where the expanded formerly pleated ribbon with its top and bottom surfaces coated with adhesive is placed between the sheets, forming the heat radiation shields which completely block each hexagonal cell, however, for drawing clarity only a few shields are indicated using broken lines.
Figure 4:
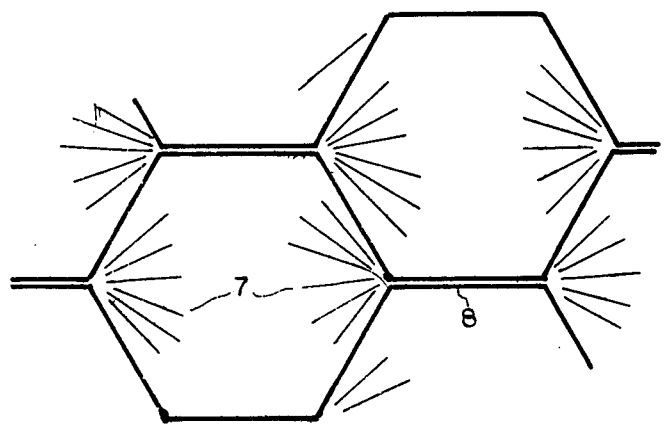
FIG. 4 is a partial enlarged cross section end view, showing the expansion of the heat radiation shields and the wrinkles thereof, near the honeycomb nodes.

FIG. 2, in an enlarged partial view, illustrates how the heat radiation pleated ribbon 4 with its adhesive coating 5 is positioned to be first compressed and then expanded to fill the cross-sections of honeycomb cells, as further illustrated in the partial and enlarged view of FIG. 4.

Figure 7:
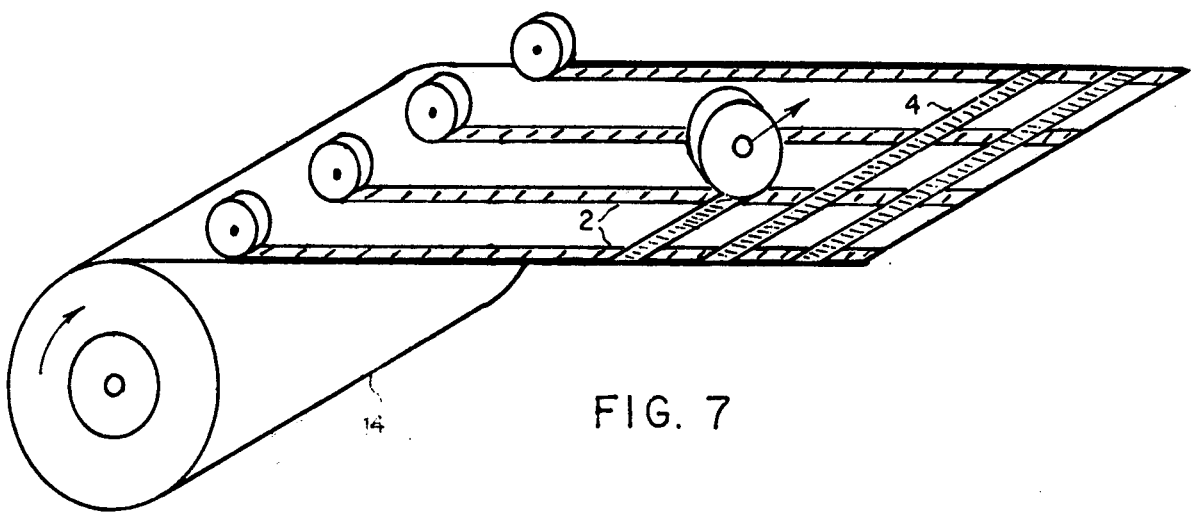
FIG. 7 shows a perspective schematic view of some of the equipment and steps employed in one of the usual methods of honeycomb manufacture, with the adhesive lines, strips, or stripes running the length of the basic material sheets, however showing how this prior method is altered by the insertions of the pleated heat radiation ribbon in a crosswise direction.
Figure 8:
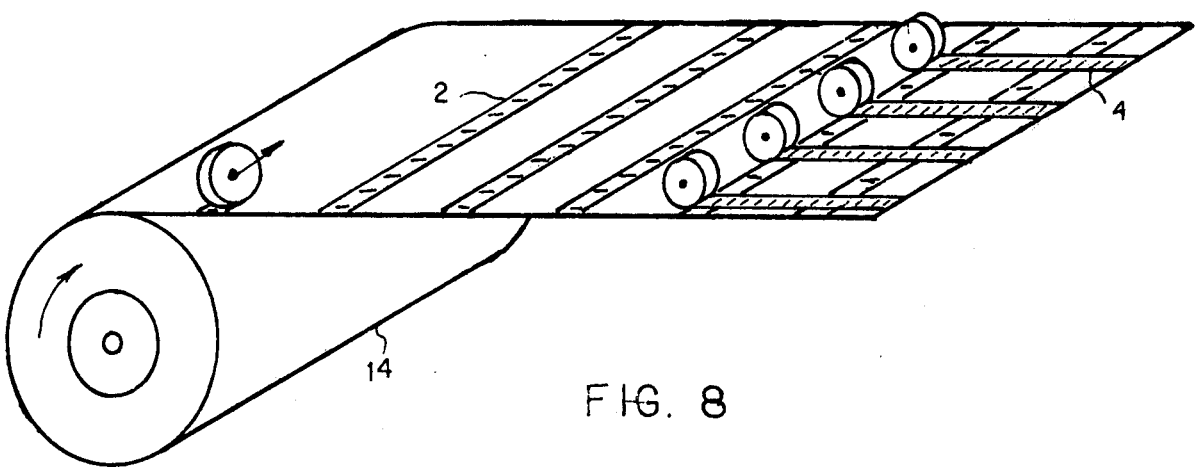
FIG. 8 in a perspective schematic view, illustrates another method wherein the pleated heat radiation ribbons are continuously fed from rolls each having an axis parallel to the axis of the roll feeding the basic material, and the adhesive lines, strips, or stripes are applied in a crosswise direction.

A selected one of the usual methods of honeycomb manufacture is partially and schematically illustrated in FIG. 7 showing the adhesive lines, strips, or stripes 2 running the unrolled length of the basic rolled material 14 from which sheets 1 are cut off sheet 1. The pleated ribbon 4 is illustrated as being inserted crosswise. Another selected method is partially and schematically illustrated in FIG. 8 where pleated ribbons 4 are continuous and are unrolled from their rolls having axes which are parallel to the axis of the roll of the basic material 14, and the adhesive stripes 2 are applied in a crosswise direction. At all times the heat radiation shield ribbon 4 is coated at the top and bottom with an adhesive 5. The resulting heat radiation shields 6, generally have some wrinkles 7 near the honeycomb nodes 8, as illustrated in FIG. 4, after the expansion of all of the honeycomb materials from their previously compressed block configuration, inclusive of the pleated ribbons of the heat radiation shield materials.

I claim:

1. A method of manufacturing honeycomb having integral heat radiation shielding materials arranged within cells of the honeycomb during its continuous manufacture, using the expansion process, creating at least one heat radiation shield in each cell of a honeycomb, wherein the radiation shields are formed of expandable pleated ribbons of thin highly reflective shielding material, comprising the steps of:
   (a) the conventional step of withdrawing a sheet of honeycomb material from either a roll or a stack;
   (b) the conventional step of determining lines, strips, or stripes on this sheet of honeycomb material where bonding of adjacent honeycomb materials is to occur, and when the honeycomb materials need an additional bonding agent, in so doing, providing adhesive lines, strips or stripes where so determined, and when the honeycomb materials are capable of being bonded together with pressure, heat, and/or catalysts, then, in so doing, providing masking materials adjacent the determined lines, strips, or stripes;
   (c) the new step of extending across the sheet of honeycomb material spaced compressed pleated strips of heat radiation shielding materials, covered top and bottom, when necessary, with adhesive, in a direction substantially at right angles to the direction of the determined lines, strips, or stripes on the sheet of honeycomb material where bonding of adjacent honeycomb materials is to occur;
   (d) the conventional step of stacking adjacent sheets of honeycomb material so their determined lines, strips, or stripes, where bonding is to occur, are offset from sheet to sheet of honeycomb material, the offsetting preferably occurring during the determining of the lines, strips, or stripes on respective adjacent sheets of honeycomb, with this stacking including the pleated strips of heat radiation shielding materials;
   (e) the conventional step of pressing together the stacked sheets of honeycomb, utilizing heat when necessary in respect to the bonding specifications, with this pressing including the pleated strips of heat radiation shielding materials; and
   (f) the conventional step of pulling apart the then reforming former sheets of honeycomb material transforming them from a non expanded block into an expanded honeycomb material, with this pulling apart including the pleated strips of heat radiation shielding materials.

2. In the method of claim 1, wherein the extending of the heat radiation shielding materials is across the direction of the movement of the basic honeycomb material as it unrolls.

3. In the method of claim 1, wherein the extending of the heat radiation shielding materials is undertaken by feeding pleated ribbons of the heat radiation shielding materials in the same direction as the flow of the basic honeycomb material as it unrolls.

4. The product, as produced by the method steps set forth in claim 1.

5. The product, as produced by the method steps set forth in claim 2.

6. The product, as produced by the method steps set forth in claim 3.

7. In the method of claim 1, during the conventional step of stacking adjacent sheets of honeycomb material, also determining the positioning of expandable pleated ribbons of thin highly reflective shielding material so they are offset from sheet to sheet of adjacent honeycomb materials.

* * * * *